Sept. 22, 1936. F. W. WALTER, JR 2,055,324
VACUUM OPERATED GEAR SHIFT
Filed Feb. 12, 1935 5 Sheets-Sheet 1
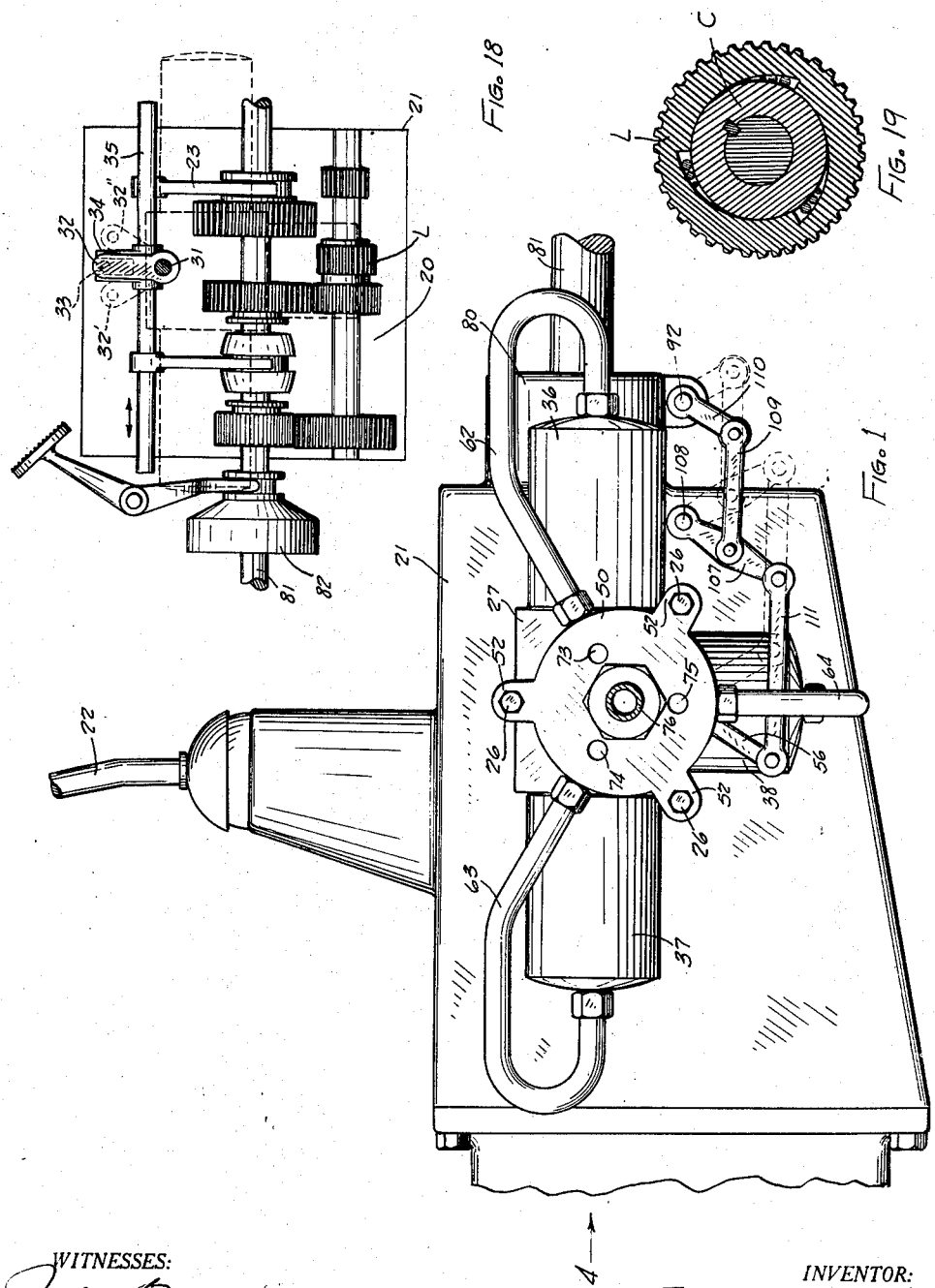
WITNESSES:
INVENTOR:
FRANK W. WALTER JR.
BY
ATTORNEY Sept. 22, 1936.  F. W. WALTER, JR  2,055,324
VACUUM OPERATED GEAR SHIFT
Filed Feb. 12, 1935  5 Sheets-Sheet 2
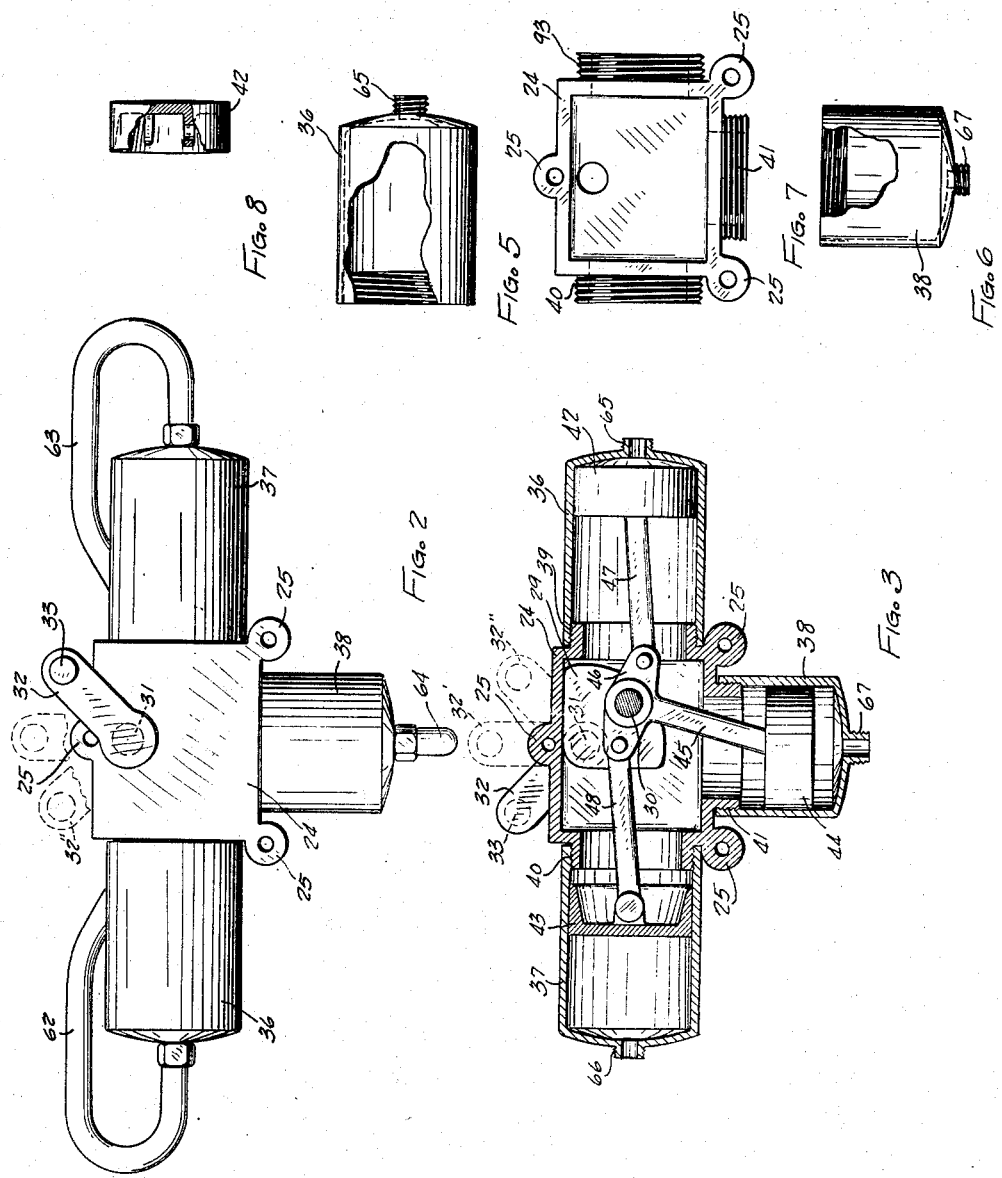
WITNESSES:
INVENTOR:
FRANK W WALTER JR.
BY
ATTORNEY

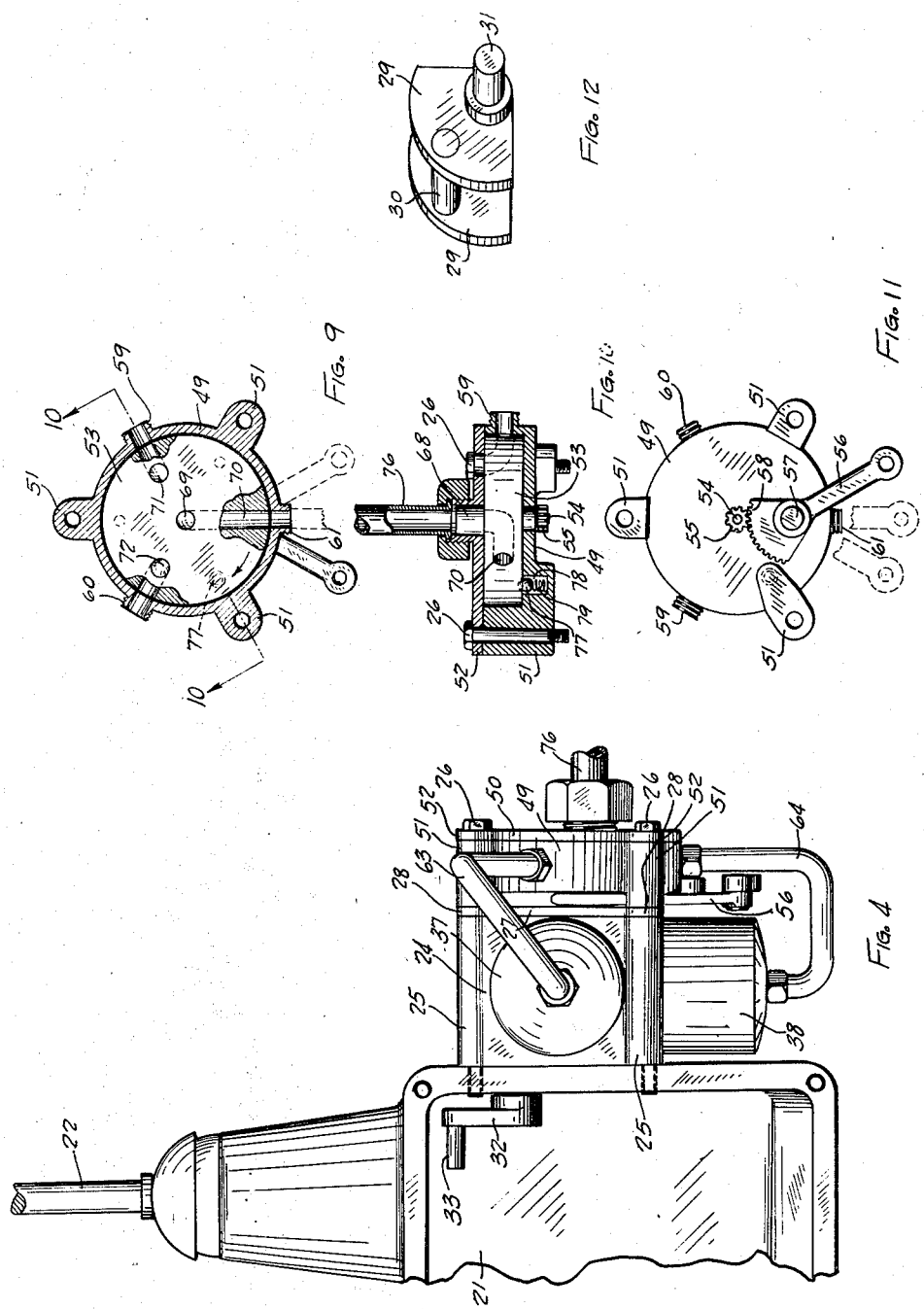

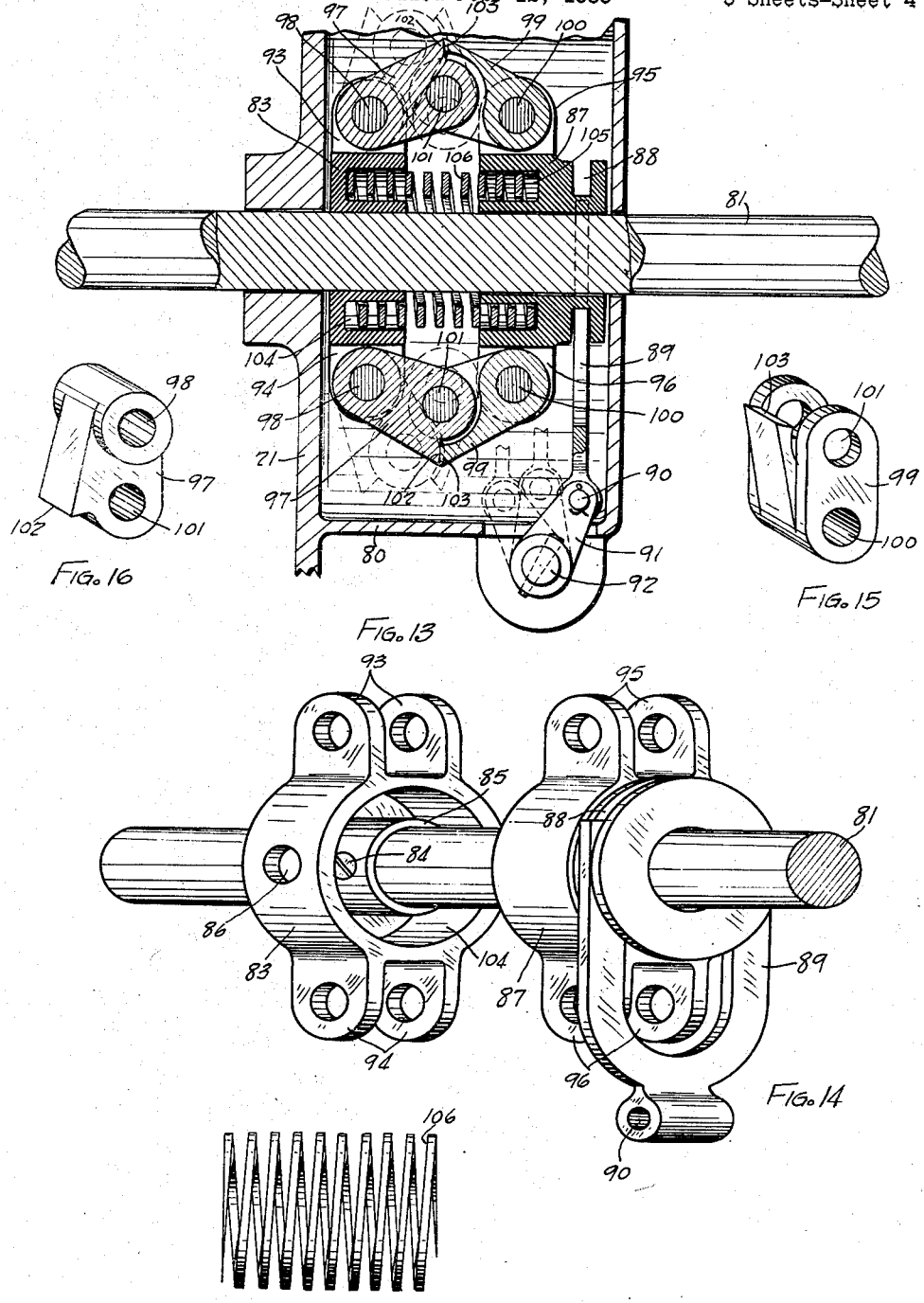

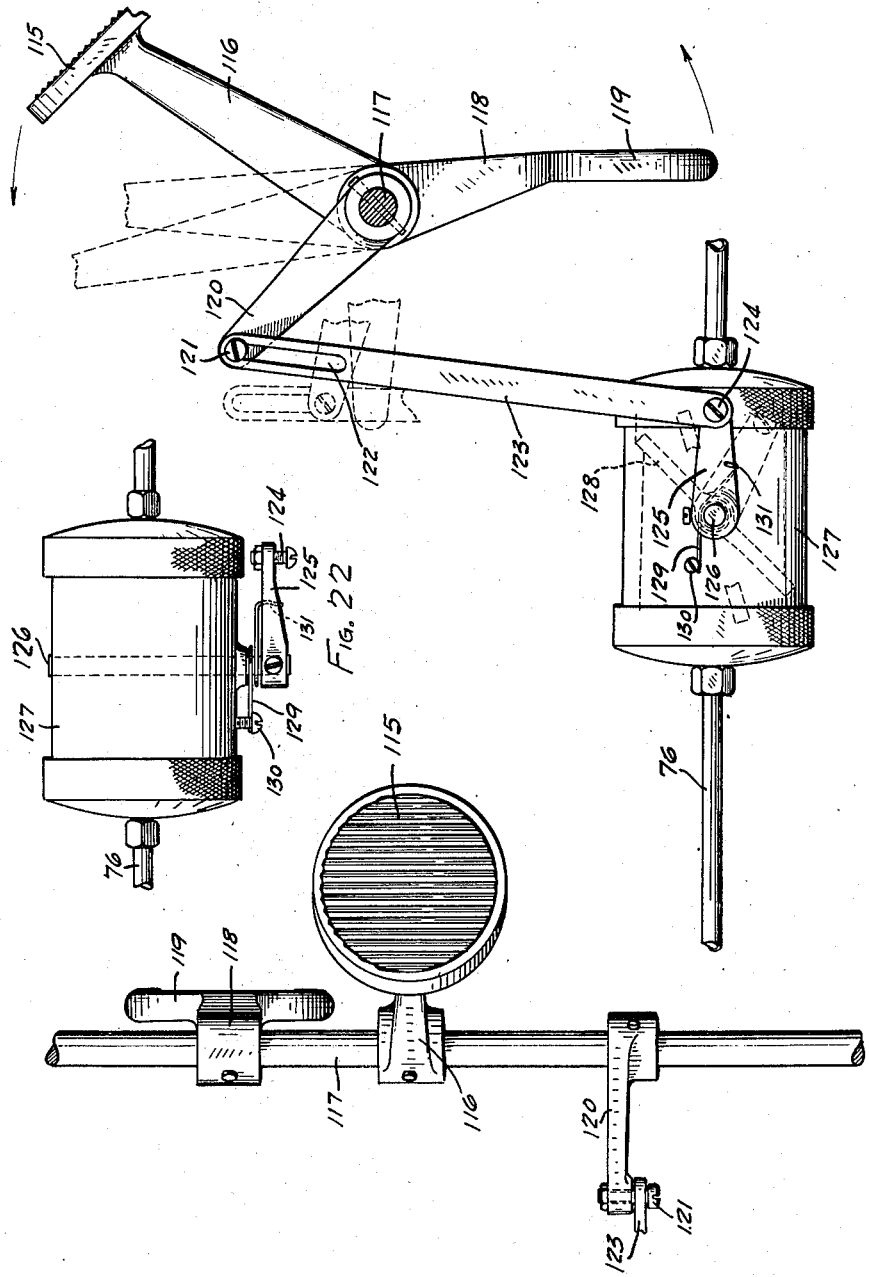

Patented Sept. 22, 1936

2,055,324

UNITED STATES PATENT OFFICE 2,055,324

VACUUM OPERATED GEAR SHIFT

Frank W. Walter, Jr., Ventnor, N. J.

Application February 12, 1935, Serial No. 6,145

4 Claims. (Cl. 74—336.5)

This invention relates to vacuum operated gear shifts, and has for an object to provide improved means for actuating the gear shift for an automotive vehicle controlled by the attenuation of air by any means, but more particularly from the intake manifold or vacuum tank ordinarily found upon such vehicles.

A further object of the invention is to provide means automatically controlled by the speed of the vehicle to effect the shifting from one speed ratio to another during the operation of the vehicle.

A further object of the invention is to provide in combination with a transmission mechanism of substantially any well known type, means whereby the initiation of motion may be manually controlled, and whereby subsequent shifts of gear ratio will be automatically controlled by the speed of the vehicle.

A further object of the invention is to provide in combination with the drive shaft of a vehicle, a centrifugal governor biased by the rotation of the shaft and having means connecting said governor with a valve organization, which said valve organization in turn controls communication with cylinders, the pistons of which when actuated by air pressure unbalanced by the attenuation of air, will cause the shifting of the transmission parts from one speed ratio to another.

A further object of the invention is to provide a valve organization which is automatically controlled by the speed of the vehicle and with a transmission mechanism having clutch connections with the driving shaft of a motor vehicle, said clutch connections holding the ratio connections until released, and when manually released to be actuated by the movement of cylinders under atmospheric pressure unbalanced by communication with an exhausted chamber, whereby the released transmission parts will be shifted from one speed ratio to another in consonance with the actual speed of the vehicle.

The invention, therefore, comprises a plurality of cylinders in which pistons are mounted to reciprocate, said cylinders being in communication with a chamber subject to exhaust and also open to the atmosphere upon the side of the pistons opposite said exhaust bias, with means for translating the movement of said pistons into movement of transmission control, said control embodying means for shifting the gear ratio within the transmission, but held against such shift by the clutch mechanism, which normally connects the transmission with the driving shaft, and operative only upon the manual release of the clutch mechanism, whereby the transmission parts are freed for movement, and thereby actuated by the movement of the pistons under the atmospheric pressure, as noted.

The drawings illustrate embodiments of the invention and the views therein are as follows:

Figure 1 is a view of the device in side elevation as attached to a gear casing of conventional form, Figure 2 is a view in side elevation from the side opposite Figure 1, but with the gear casing omitted, Figure 3 is a longitudinal sectional view, Figure 4 is a view in end elevation as indicated by arrow 4 at Figure 1, Figure 5 is a view partly in side elevation, and partly in section of one of the longitudinal cylinders, Figure 6 is a view partly in elevation and partly in section of the vertical cylinder, Figure 7 is a view in side elevation of the housing to which the cylinders are attached, Figure 8 is a view partly in elevation and partly in section of one of the pistons, Figure 9 is a view of the control valve with the top of the valve housing removed and parts of the valve body broken away, Figure 10 is a view of the valve showing the housing in diametrical section, as indicated by line 10—10 of Figure 9, with the valve body in edge elevation, Figure 11 is a view of the valve organization in rear elevation, Figure 12 is a perspective view of the means for limiting the piston movement, Figure 13 is a view in enlarged detailed section of the governor, Figure 14 is a somewhat exploded perspective of governor parts, Figures 15 and 16 are, respectively, the centrifugally actuated governor links, Figure 17 is a view in elevation of the spring employed in the governor, Figure 18 is a view of a conventional transmission with the operating cam of the shifting mechanism associated therewith, Figure 19 is a view in elevation of the "low" gear provided with a conventional overrunning clutch.

Figure 20 is a side view, somewhat diagrammatic of the operating connections between a valve in the vacuum line and the clutch pedal.

Figure 21 is a top plan view of the clutch pedal and associated parts, and

Figure 22 is a detail showing in top plan of the valve which is operatively connected to the clutch pedal.

The present invention presupposes the use upon a motor vehicle or the like, of a transmission of any well known type, and indicated at 20 merely conventionally without any limitation as to its construction. This transmission is contained within a casing 21, also shown conveniently, with which a manual gear shift lever 22 communicates, and through the medium of the part 23, adapted to shift the gear ratio of the transmission between the positions usually known as "low" and "reverse". These parts correspond identically with any corresponding parts found in transmissions, except that the "low" gear L must be provided with an overrunning clutch C, as shown at Figure 19, for the purposes hereinafter brought out.

The controlling mechanism comprises a housing 24 which is rigidly connected with the gear casing. As shown, tubular offsets 25 provide means whereby the housing is attached rigidly to the side of the gear housing by means of bolts 26, which said bolts also have a further function, as will be hereinafter more fully brought out. The housing is provided with a cover member or closure 27 which is provided with ears 28 through which the said bolts 26 extend.

Within the housing 24 a limiting member is mounted, comprising spaced segments 29 having a connecting wrist pin 30 and journalled to oscillate upon a trunnion 31 which extends through an opening in the wall of the gear casing, and is provided with a crank arm 32 therein which is provided with a pin 33 engaging the bifurcated member 34 on the shift rod 35 through the medium of which the gear ratio is shifted between the ratio known as "high" and "second". The housing 24 is provided upon opposite sides with cylinders 36 and 37, and with a cylinder 38 perpendicular to the cylinders 36 and 37. These cylinders are, respectively, attached to the housing in any approved manner, and screw threads 39, 40 and 41, shown for the purpose, are merely illustrative of a convenient and mechanically acceptable means.

Within the cylinders 36, 37 and 38 are, respectively, mounted pistons 42, 43 and 44. The piston 44 is provided with a master connecting rod 45 having a T-head 46 to which are pivoted the connecting rods 47 and 48 of the pistons 42 and 43, respectively. This T-head 46 is also, as will be noted, more particularly from Figure 3, journalled upon the connecting wrist pin 30 of the stop member shown in perspective at Figure 12.

Mounted upon the housing 24 is a valve housing 49 having a cover member 50 and provided, respectively, with ears 51 and 52 through which extend the bolts 26 whereby the bolts 26 serve to maintain the entire structure in rigid association with the gear casing.

The valve housing has a circular interior and a valve body 53 mounted therein to rotate upon a valve spindle 54. This valve spindle is provided with a pinion 55, and a lever 56 fulcrumed at 57 is provided with a segmental gear 58. It is obvious that as the lever 56 is oscillated through the several positions, indicated in dotted lines at Figure 11, that the valve body 53 will be rotated or oscillated within the housing. The valve is provided with a plurality of connecting members, shown as nipples 59, 60 and 61, to which are, respectively, attached tubes 62, 63 and 64 which, being bent and curved to the proper and required curvature, connect, respectively, with connecting members shown as nipples 65, 66 and 67 on the cylinders 36, 37 and 38, respectively.

The valve body 53 is provided with a central boss 68 communicating with a central passage 69 which in turn communicates with a radial passage 70 which, as the valve body rotates or oscillates, is adapted to make communication with the several outlets identified as the nipples 59, 60 and 61. The valve body also has other openings 71 and 72 which are adapted to register with some one of the perforations 73, 74 or 75 of the valve cover 50. The central boss 67 communicates by means of a pipe 76 with any exhausted chamber, the most convenient ordinarily being the "vacuum tank" of the internal combustion engine. To insure the stoppage of the valve body 53 in proper register with any of the openings, indicated by the nipples 59, 60 or 61, a detent member is provided comprising specifically a ball 77 set in a socket 78 and controlled by a spring 79, as shown more clearly at Figure 10.

Secured upon or integral with the gear casing 21, is an auxiliary governor casing 80. At Figure 13 this governor casing is shown as integral with the gear casing 21, but integrality is wholly a matter of choice. Through this governor casing 80 the driven part of the drive shaft 81 extends and the drive shaft 81 is provided with the usual manual or foot clutch 82 which is shown conventionally at Figure 18, without attempt at accuracy.

Within the governor casing 80, a member 83 is rigidly secured to the drive shaft 81, in any approved manner. As shown at Figure 14, this is accomplished by means of a set screw 84 which passes through the hub 85 of the member 83 and is inserted through an opening 86. This, however, is merely a matter of choice and may be varied as found desirable.

Sliding upon the drive shaft 81 is a member 87 which is provided with a furrow 88 engaged by a bifurcated yoke 89 which is pivoted at 90 to an arm 91 fulcrumed at 92.

The members 83 and 87 are, respectively, provided with ears 93, 94, 95 and 96, arranged in spaced pairs. Between the ears 93 and 94 centrifugal links 97 are pivoted at 98 and between the ears 95 and 96, respectively, are pivoted the links 99 at 100. These links 97 and 99 are hinged together at 101 so that when affected by centrifugal force they may move from the full line to dotted line positions, as shown at Figure 13. The links 97 and 99 are, respectively, provided with stops 102 and 103 so that when in full line positions, as shown at Figure 13, these stops are in engagement to prevent further hinging movement of the links.

The members 83 and 87 are provided with annular recesses 104 and 105 in which is mounted a spring 106 providing tension tending to separate the members 83 and 87 to the full line position shown at Figure 13, but yielding under the centrifugal force to permit the members 83 and 87 to approach each other, and the links 97 and 99 to assume the dotted line positions whereby the yoke 89 and arm 91 are, respectively, moved through the dotted line positions shown at said Figure 13.

The governor is connected with and to operate the valve by means of a lever 107 fulcrumed at 108 on the gear casing, and connected by means of a link 109 with an arm 110 rigidly mounted upon the trunnion 92. The lever 107 is also connected by a link 111 with the arm 56, said linkage being adapted to move from the full line position, as shown at Figure 1, to the dotted line position.

Referring now to Figures 20, 21 and 22, a clutch pedal is shown at 115 as being carried at one end of an arm 116 that is nonrotatably connected to a shaft 117. Drivably carried by the shaft 117 is a depending arm 118 that has a bifurcated end 119 that engages the clutch member 82. It is evident that upon movement of the pedal 115 in the direction of the arrow at the top of Figure 20, the clutch member 82 will be shifted in the direction of the arrow at the bottom of Figure 20.

The shaft 117 also drivably carries an arm 120 from the free end of which extends a pin 121. This pin 121 is received in a slot 122 in a link 123 that is pivotally connected at 124 with a crank arm 125 extending from a valve shaft 126. The valve shaft 126 extends into a valve casing 127 that is included in the line 76 and interiorly of the casing 127 the valve 126 carries a valve member 128 which is shown as being of the so-called "butterfly" type. A leaf spring is shown at 129 as having one end engaging a pin 130 on the valve casing 127 and the other end engaging the crank arm 125, as indicated at 131.

This spring 129 is normally effective to maintain the valve member 128 in position closing the line 76; however, upon the pedal 115 being moved so far in the direction of the arrow at the top of Figure 20 that the pin 121 engages the extremity of the slot 122, then the link 123 will be affected to cause the crank arm 125 to turn the valve shaft 126 to open the valve member 128 and establish free communication in the line 76.

In operation, the initiation of movement of the vehicle is accomplished in the usual manner by the manipulation of the shift lever 22 acting through the medium of the member 23 in the usual manner to interengage the low gear L. Under this condition of engagement of the low gear and the car at a standstill the cylinder 38 is in communication with the line 76 so that upon depression of the clutch pedal 115 to its complete limit of movement the valve 128 will be opened to exhaust the cylinder 38 and draw the piston 44 to the bottom thereof. As explained, this low gear is provided with an overrunning clutch C, so that when the vehicle has started under the impulse imparted thereto by the low gear, the interengagement may be maintained. As the speed of the vehicle increases, the driving shaft 81, of course, rotates with greater speed, and affects the governor exerting tension through the linkage 107 to 111 upon the arms 56 and thereby upon the valve 53.

When the stress exerted by the governor, controlled by the speed, is sufficient to overcome the resistance of the detent 77, the valve will snap into second gear position by rotating in the direction indicated by the arrow at Figure 9, such position putting the radial passage 70 in communication with the outlet indicated by the nipple 60, and the air will, therefore, be exhausted through the tube 62, exhausting the cylinder 36, and moving the piston to the position shown at Figure 3. This will oscillate the arm 32 so that it will move to the position 32' shown at Figure 18, to shift the rod 35 to throw into action the second gear. While in second gear the speed of the vehicle will increase, again rotating the shaft 81 at a greater speed and tending to move the governor, as shown at Figure 13, entirely to the dotted line position, which movement will be resisted by the detent 77 of the valve, and the linkage connecting until the tension exerted by the centrifugal action of the links 97 and 99 overcomes the resistance of the detent and the valve 53 moves another third revolution to place the radial conduit 70 in communication with the port indicated by the nipple 59 at Figure 9. This will place the tube 63 under the action of exhaust, which will likewise exhaust the cylinder 37.

In the normal shifting of gears manually, it is necessary to release the clutch before shifting can be accomplished. In the present instance the same is necessary as the interengagement of the gears will prevent the shifting unless and until the clutch has been released. When, therefore, the speed of the vehicle has increased under the action of the second gear, the clutch is depressed to cause the valve 128 to open whereby the line 76 is opened and the air exhausted from the cylinder 37, and the atmospheric air entering through the opening 74 will act upon the piston 43 to move that piston to the opposite extreme of its movement, thereby oscillating the member 29 and throwing the arm 32 to the position 32'' and moving the rod 35, will effect the shifting of the gears from "second" to "high".

When and if the vehicle slows in its action, it may be maintained in "high" gear until it comes entirely to a stop by simply allowing the clutch to remain in engagement, or as the vehicle loses headway, the clutch may be released and through the linkage, as described, and the valve, the gear will again be shifted from "high" to "second". This position may likewise be maintained until the vehicle comes to rest, or, at a still greater reduction of speed, the clutch may again be actuated and the valve rotated to the full line position shown at Figure 9, wherein the radial conduit 70 is in communication through the port indicated by the nipple 67 with the pipe 64 and thereby, in turn with the cylinder 38, moving the member 29 so that the arm 32' occupies the intermediate position 32'' which will be the full line position shown at Figure 18, and the gear will be in neutral so far as "high" and "second" are concerned, but still in gear with the "low", which will continue to move the vehicle in the usual manner.

Of course, the vacuum operated gear shift illustrated may be modified and changed in various ways without departing from the invention herein set forth and hereinafter claimed.

I claim:—

1. In a vacuum operated gear shift, gearing including a gear moving into positions establishing reverse and low and an intermediate position constituting a neutral position for said gear, a pin operatively connected to said gear for causing movement of said gear, said pin being pivotally mounted at one end on a shaft, a connecting member drivably connected to said shaft, a plurality of cylinders disposed about said shaft, a piston in each of said cylinders, links connecting each of said pistons with said connecting member, and means for selectively exhausting air in each of said cylinders whereby the piston in the cylinder from which the air is exhausted is rendered effective to move the connecting member into a predetermined position causing a corresponding movement on the part of the gear.

2. In a vacuum operated gear shift, a shaft, three cylinders disposed about said shaft, a connecting member drivably connected to said shaft, a piston in each of said cylinders, a T-member pivotally mounted on said connecting member with the long end of the T connected to one of said pistons, links connecting each end of the T with each of the other pistons, means for selectively exhausting air from each of the cylinders, gearing including a gear adapted to assume different effective positions, and operative connections between said gear and said shaft whereby rotation of said shaft is effective to move said gear into its effective positions.

3. In a vacuum operated gear shift, a cylinder housing defining three cylinders which meet together at one end, a shaft rotatably mounted in said housing at a point common to the extremity of said cylinder, a sector having its apex drivably connected to said shaft, a T-connecting member pivotally mounted on said sector at the cross on said T, pistons in each of the cylinders, one of said pistons being connected to the long arm of said T-connecting member, there being links between the extremities of the cross of said T and each of the other pistons, means for selectively exhausting air from said cylinders, gearing including a gear movable into positions establishing different gear ratios, and operative connections between said gear and said shaft whereby rotation of the shaft under influence of the pistons causes movement of the gear into different positions.

4. In a vacuum operated gear shift, a gearing including a gear movable into positions establishing reverse and low and an intermediate position constituting a neutral position for said gear, a clutch member movable into positions establishing second and high and adapted to assume a position intermediate the last mentioned two positions to establish a neutral position for said clutch member, a plurality of cylinders, a piston in each of said cylinders operatively connected to the said clutch member, means for selectively exhausting air from each of the said cylinders, a valve controlling the operation of said exhaust means, a driving shaft, a driven shaft, a governor on said driven shaft for automatically operating said valve control means, and connections between the first gear and the driving shaft including an overrunning clutch whereby said connections are rendered ineffective upon increase in speed of rotation of said driven shaft.

FRANK W. WALTER, Jr.